Jan. 1, 1963     I. SCHRIER     3,070,846
MOLD CONSTRUCTION FOR CASTING THERMOSETTING PLASTICS
OF ACCURATELY CONTROLLED SHAPE
Filed June 20, 1960
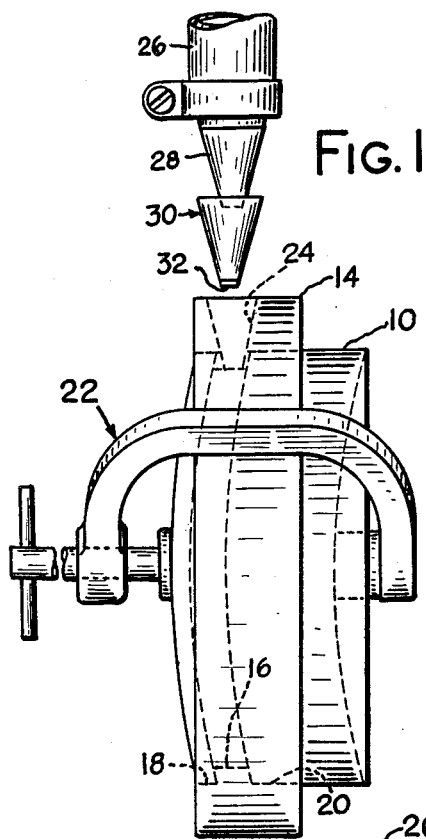
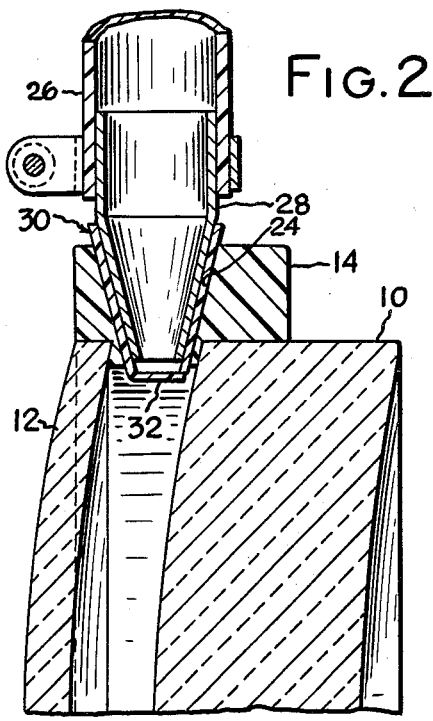
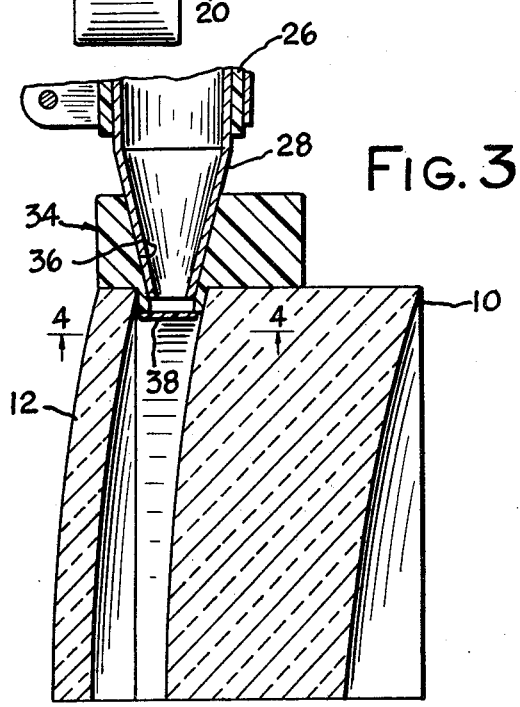
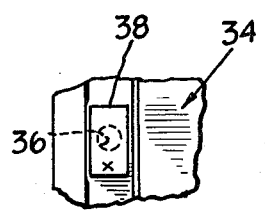
INVENTOR.
ISRAEL SCHRIER
BY *Frank C. Parker*
*Hoffman Stone*
ATTORNEYS

United States Patent Office 3,070,846
Patented Jan. 1, 1963

3,070,846
MOLD CONSTRUCTION FOR CASTING THERMO-SETTING PLASTICS OF ACCURATELY CONTROLLED SHAPE
Israel Schrier, Irondequoit, N.Y., assignor to Bausch & Lomb Incorporated, a corporation of New York
Filed June 29, 1960, Ser. No. 37,175
5 Claims. (Cl. 18—39)

This invention relates to an improved mold construction for casting thermosetting plastics, and, more particularly, to an improved arrangement for filling molds of the type used for casting optical elements without distorting the molds, thereby permitting the attainment of improved dimensional accuracy.

The manufacture of plastic optical elements such as spectacle lenses and the like, which are subject to relatively hard use has been found to be a relatively difficult procedure. Because of the service requirements, thermoplastic materials are not suitable, and the elements must be cast from clear, transparent thermosetting materials. There is no presently known method of polishing presently known transparent thermosetting plastics to commercial requirements, and it is therefore necessary to cast the optical elements precisely to their required finished shapes.

Since it is often desired to mate various different front and back surface curvatures, the usual practice has been to cast optical elements in a mold consisting of front and back halves spaced apart around their edges by a relatively soft, compressible gasket. One problem relative to such molds has been the difficulty of filling them with the plastic monomer, or prepolymer without disturbing the alignment of the two mold halves and thereby adversely affecting the optical quality of the resulting lens such as for example, introducing a prism.

One filling method is described in the United States patent to Beattie, No. 2,542,386, which discloses the use of a relatively flat nozzle for discharging a liquid monomer into the mold while the gasket is partly withdrawn from between the mold halves. After the mold is filled, the gasket is either pushed or allowed to resile back into place between the mold halves.

In that method it has been found that a relatively high degree of operator care and skill are required in order to avoid misalignment of the two mold halves relative to each other due to the temporary displacement from and subsequent return of the gasket to its normal position between the mold halves. It is also difficult to avoid introducing cured or partly cured plastic into the molds when filling them according to this previous method. Overflow plastic tends to adhere to the nozzle and to the mold edges, then to become dislodged during filling and to fall into the molds along with the monomer. Such cured, or partly cured material causes blemishes in the lenses and often renders them unmarketable.

Another object is to provide an improved gasket construction to permit filling molds of this type without danger of disturbing the relative position of the two mold halves.

Another object is to provide an improved gasket having a radial aperture to permit filling of a mold of this type without disturbing the position of the gasket between the mold halves, and also minimizing the possibility of introducing unwanted material into the mold.

Yet another object is to provide an improved filling device for filling a mold of this type and for effectively sealing the gasket aperture after the mold has been filled to prevent leakage of the contents of the mold through the gasket aperture.

The foregoing and other objects and advantages of the present invention will become apparent in the following detailed description of representative embodiments thereof, taken in conjunction with the drawing, wherein:

FIG. 1 is a side elevational view of a mold according to the present invention;

FIG. 2 is a fragmentary sectional view of the mold shown in FIG. 1, particularly showing details of the filling arrangement;

FIG. 3 is a fragmentary cross sectional view generally similar to the view of FIG. 2, but showing a filling arrangement according to a second embodiment of the invention; and FIG. 4 is a fragmentary, horizontal sectional view taken along the line 4—4 of FIG. 3.

Briefly, the present invention contemplates a mold gasket having a radial passageway, which is preferably tapered inwardly, and through which the plastic prepolymer is inserted into the mold. A flap valve is provided at the inner end of the passageway for preventing leakage of the pre-polymer from the mold after it is filled. In the presently preferred arrangement, the valve is formed integrally with a separate nib, which may be of inexpensive molded construction, and which fits within the passageway in the gasket during filling and remains with the gasket through the curing cycle. Alternatively, the valve may be integrally molded with the gasket, or may be constituted by a relatively small flap of a flexible material cemented to the inner wall of the gasket in a separate operation.

With this arrangement, once the mold is assembled, there is relatively little likelihood of displacing the two mold halves relative to each other, and the mold may be filled by relatively unskilled and inexperienced personnel without danger of misalignment or of failure of the gasket to remain properly seated between the mold halves.

Referring first to FIGS. 1 and 2, the filling arrangement according to a first embodiment of the invention is illustrated in connection with a spectacle lens mold, which includes two mold halves 10 and 12, respectively, and a peripheral gasket 14 seated between the mold halves. The mold halves 10 and 12 are preferably made of glass so that their confronting surfaces may be smoothly and accurately finished to the desired curvatures.

The gasket 14 is annular, and includes a radially inwardly projecting flange 16 for spacing the mold halves 10 and 12 apart. As shown, a C-clamp 22 or any other desired arrangement serves to clamp the mold and to urge the mold halves 10 and 12 into pressure engagement with the annular flange 16 of the gasket, thus securing the mold in its assembled condition.

According to the present invention, a passageway 24 extends radially through the gasket 14, opening at its inner end on the radially inwardly facing surface of the flange 16. Preferably, the passageway 24 tapers inwardly. The monomer or pre-polymer mix is fluid and is conducted through a flexible tube 26 from a storage container (not shown) for filling the mold. A tapered nozzle 28 is attached to the delivery end of the tube 26, and a nib 30 having a hinged flap valve 32 at its narrow end, is fitted over the nozzle 28 for filling purposes. The passageway 24, the nib 30, and the nozzle 28 are all similarly tapered so that they nest, as best seen in FIG. 2, in relatively tight sealing engagement with each other during the mold filling operation.

The nib fits snugly within the passageway 24 in the gasket, being placed firmly therein by the operator, who grasps the lower end of the tube 26 or the nozzle 28. The operator then opens a valve (not shown) to permit the monomer or pre-polymer to flow through the nib 30 to fill the mold. The flexibility and stretchability of the gasket are sufficient to allow the basket 14 to yield away from the mold halves 10 and 12 to permit air to escape without the need for excessive pressure feed of the monomer or pre-polymer. When the mold is filled to the desired level, the monomer flow is shut off, allowing the flap valve 32 to resume its normal closed position, and the nozzle 28 is removed. The nib 30 is left in the gasket 14 to seal the passageway 24 so that the mold may be handled without danger of the monomer leaking out of it.

Since the nozzle 28 seats tightly within the nib 30 any overflow monomer is forced out around the mold edges, between the gasket 14 and the mold halves 10 and 12, leaving the nozzle 28 substantially free of excess monomer. This is of advantage because in the previous filling methods, excess monomer on the nozzle tends to cure and to break away from the nozzle and fall into the molds thus spoiling the lenses. The chance for this happening in the practice of the present invention is minimized. Moreover, there is no danger of foreign matter such as dirt or cured plastic entering the mold from the edges of the mold halves.

The filling system of the invention is also advantageous in that substantially all leakage of the monomer or pre-polymer is eliminated, rendering the operating conditions cleaner and less toxic with a consequent saving in clean-up costs. This advantage alone may be sufficient to pay for the nibs 30, which are relatively inexpensive. They may be molded of cheap plastic material such as, for example, polyethylene or polyvinyl chloride, or any other desired material that does not adversely affect the plastic being cured.

According to a second embodiment of the invention, the flap valve is formed integrally with the gasket, rather than being part of a separate member such as the nib 30. This arrangement is illustrated in FIGS. 3 and 4, wherein the gasket 34 is shown having a radial tapered passageway 36, which is normally closed at its inner end by a flap valve 38. The flap valve 38 may be molded integrally with the gasket 34, or may be constituted by a relatively small, thin and flexible piece of sheet material, which is cemented or otherwise fixed to the inner surface of the gasket 34 immediately adjacent to the inner end of the passageway 36, and which has a yieldable portion extending over the passageway opening. In this embodiment, the nozzle 28 is fitted directly into the passageway 36 for filling the mold, and no auxiliary equipment such as the nib 30 is used.

The choice between the first and second embodiments of the invention may be made on the basis of their relative costs, taking into account not only the manufacturing costs of the nibs 30 as against the manufacturing costs of forming flap valves directly on the gasket, but also any difference in production costs and efficiency due to the use or non-use of the nibs 30.

In both embodiments of the invention, the entire mold assembly remains undisturbed during the mold filling operation, the danger of introducing unwanted material into the mold is minimized, and the danger of misaligning the two mold halves 10 and 12 relative to each other is practically eliminated, resulting in an overall improvement in product quality, and a higher manufacturing yield than heretofore possible.

What is claimed is:

1. A filler arrangement for molds of the type used in the manufacture of optical elements having two relatively rigid mold elements disposed in spaced relation relative to each other, said arrangement comprising a flexible gasket adapted for positioning intermediate the mold elements and controlling the relative position of said mold elements, said gasket defining a passageway extending through said gasket and opening within the mold, an integral valve integral with said gasket on the inner end of said passageway sealing said passageway against the escape of fluid from within the mold.

2. A filler arrangement for molds of the type used in the manufacture of optical elements having two relatively rigid mold halves disposed in spaced relation relative to each other, said arrangement comprising a flexible gasket adapted for positioning intermediate the mold halves and maintaining the relative position of the mold halves, means in said gasket defining a radial passageway extending through said gasket and opening within the mold, a nib adapted to fit over the nozzle of a fluid supply line and snugly seating in the passageway in said gasket, a valve on said nib preventing the escape of fluid from the mold through the passageway when said nozzle is removed.

3. A filler arrangement for molds of the type used in the manufacture of optical elements comprising two relatively rigid mold halves, a flexible gasket positioned intermediate said two mold halves maintaining the relative position of said mold halves and flexing to permit the escape of air from the mold between the gasket and mold halves upon filling, means in said gasket defining an inwardly tapered passageway extending through said gasket and opening within said mold, a flap valve on said gasket at the inner end of said passageway sealing said passageway against the escape of fluid from within said mold, a nozzle adapted for attachment to a fluid supply line for filling the mold, a tapered portion on said nozzle tapered to snugly fit the passageway in said gasket to facilitate the filling of said mold.

4. A filler arrangement for molds of the type used in the manufacture of optical elements comprising two relatively rigid mold halves, a flexible gasket intermediate said mold halves controlling the relative position of said mold halves and flexing to permit escape of air from within said mold during the process of filling, means in said gasket defining an inwardly tapered passageway extending through said gasket and opening within the mold, a tapered nozzle adapted for connection to a fluid supply line for filling the mold with a fluid, a tapered nib tapered to fit over said nozzle and snugly engaging said passageway, a flap valve on said nib closing and preventing escape of fluid from the mold when said nozzle is removed from said nib.

5. A filler arrangement for molds of the type used in the manufacture of optical elements including two relatively rigid mold halves disposed in spaced relation relative to each other by an intermediate flexible gasket, said arrangement comprising, means in said gasket defining a radial passageway extending through the gasket and opening within the mold, a nib adapted for fitting over a nozzle connected to a fluid supply line and sealingly retained within the radial passageway of said gasket, a flap valve at the inner end of said nib closing to prevent escape of the fluid from the mold as said nozzle is removed from said nib.

References Cited in the file of this patent

UNITED STATES PATENTS

| 1,715,942 | Morgan | June 4, 1929 |
| 2,406,361 | Fairbank | Aug. 27, 1946 |
| 2,704,265 | Lyon | Mar. 15, 1955 |
| 2,838,798 | Rekettye | June 17, 1958 |

FOREIGN PATENTS

| 18,448 | Great Britain | 1903 |
| 490,381 | Great Britain | Jan. 15, 1938 |
| 606,331 | Great Britain | Aug. 11, 1948 |
| 615,985 | Great Britain | Jan. 14, 1949 |